United States Patent [19]
Nakai et al.

[11] Patent Number: 5,092,920
[45] Date of Patent: * Mar. 3, 1992

[54] SINTERED BODY FOR HIGH-ACCURACY WORKING TOOLS

[75] Inventors: Tetsuo Nakai; Mitsuhiro Goto; Tomohiro Fukaya, all of Hyogo, Japan

[73] Assignee: Sumitomo Electric Industries, Ltd., Osaka, Japan

[ * ] Notice: The portion of the term of this patent subsequent to Aug. 20, 2008 has been disclaimed.

[21] Appl. No.: 450,849

[22] Filed: Dec. 13, 1989

[30] Foreign Application Priority Data

Dec. 14, 1988 [JP] Japan ............... 63-316008

[51] Int. Cl.$^5$ ............... C22C 29/14
[52] U.S. Cl. ............... 75/238; 75/244; 501/87; 501/96
[58] Field of Search ............... 420/580, 581; 501/87, 501/96; 75/238, 241, 244

[56] References Cited

U.S. PATENT DOCUMENTS

| | | | |
|---|---|---|---|
| 4,375,517 | 3/1983 | Watanabe et al. | 501/87 |
| 4,693,746 | 9/1987 | Nakai et al. | 75/238 |
| 4,911,756 | 3/1990 | Nakai et al. | 75/241 |

FOREIGN PATENT DOCUMENTS

| | | | |
|---|---|---|---|
| 53-77811 | 7/1978 | Japan . | |
| 97579 | 6/1984 | Japan | 501/96 |

Primary Examiner—R. Dean
Assistant Examiner—George Wyszomierski
Attorney, Agent, or Firm—W. G. Fasse; D. H. Kane, Jr.

[57] ABSTRACT

A sintered body for high-accuracy working tools is obtained by sintering powder mixture containing at least 45 percent by volume and not more than 60 percent by volume of cubic boron nitride powder having an average particle size of not more than 2 μm and having a remainder formed of binder powder under a superhigh pressure. The binder contains at least 5 percent by weight and not more than 15 percent by weight of Al and at least 2 percent by weight and not more than 20 percent by weight of W, and has a binder remainder formed of a Ti compound or compounds. The atomic ratio of Ti contained in the binder to a transition metal element or elements belonging to any of the groups IVa, Va and/or VIa of the periodic table including Ti is at least ⅔ and not more than 97/100. In the structure of the sintered body, cubic boron nitride crystals are bonded with each other through bonding phases formed by the binder. When at least one or more Ti compounds are selected from a group of $TiN_z$, $Ti(C_{1-x}N_x)_z$, $(Ti,M)(C_{1-x}N_x)_z$ and $(Ti,M)N_z$, where M represents transition metal element or elements belonging to any of the groups IVa, Va and/or VIa of the periodic table excluding wherein z is within the range $0.45 \leq z \leq 0.65$ and x is within the range $0.50 \leq x < 1.0$. A sintered body is obtained which is excellent in strength and improved in wear resistance and useful as a material for making high-accuracy cutting tools.

12 Claims, No Drawings

SINTERED BODY FOR HIGH-ACCURACY WORKING TOOLS

FIELD OF THE INVENTION

The present invention relates to an improvement in a sintered body for high-accuracy working tools made of cubic boron nitride (hereinafter referred to as CBN).

BACKGROUND INFORMATION

CBN is the hardest material next to diamond, and a sintered body made of CBN is used for making various cutting tools. Japanese Patent Laying-Open No. 53-77811(1978) discloses an example of such a CBN sintered body suitable for cutting tools.

The sintered body disclosed in the above prior art contains 80 to 40 percent by volume of CBN and has a remainder mainly formed of a carbide, nitride, boride or silicide of a transition metal belonging to any one of groups IVa, Va or VIa of the periodic table or a mixture or solid solution compound thereof, with an addition of Al and/or Si. In the above CBN sintered body, the aforementioned compound forms continuous bonding phases in the structure of the sintered body.

In the aforementioned hard sintered body for tools, a bonding compound is prepared of a carbide, nitride, boride or silicide of a transition metal belonging to any one of groups IVa, Va or VIa of the periodic table or a solid solution compound thereof. Since such a compound has an excellent thermal conductivity and high hardness, the sintered body generally exhibits high performance when the same is applied to a cutting tool.

However, when the sintered body which is disclosed in the above Japanese Patent Laying-Open No. 53-77811(1978) and now on the market, is applied to high-accuracy working of hardened steel, for example, the workpiece deteriorates as its surface becomes rough and the dimensional accuracy during the cutting work depends on the cutting conditions. Further, the life of the cutting tool is relatively short. It is believed that the workpiece surface roughness and its low dimensional accuracy are due to an insufficient strength of the cutting edge or due to progress of wear caused by CBN particles falling out of the tool.

SUMMARY OF THE INVENTION

Accordingly, it is an object of the present invention to provide a sintered body for high-accuracy working tools which is superior in strength to the aforementioned conventional CBN sintered body, is improved in its wear resistance due to preventing CBN particles from falling out of the tool, and which is capable of stably performing a high-accuracy cutting operation.

It has been found that the aforementioned first object, has been achieved by a CBN sintered body which is higher in hardness than and superior in wear resistance to the conventional CBN sintered body which has been obtained by sintering a powder mixture containing 45 to 60 percent by volume of cubic boron nitride powder of not more than 2 μm in average particle size and having a remainder formed of a binder described below, whereby the sintering takes place under a superhigh pressure.

The sintered body according to the present invention is obtained by mixing CBN powder with a binder containing one or more Ti compounds selected from a group of $TiN_z$, $Ti(C_{1-x}N_x)_z$, $(Ti,M)(C_{1-x}N_x)_z$ and $(Ti,M)N_z$, where M represents a transition metal element or transition metal elements belonging to any one of the groups IVa, Va and/or VIa of the periodic table excluding Ti, wherein z is within the range of $0.45 \leq z \leq 0.65$ and x is within the range of $0.50 \leq x < 1.0$, such that the atomic ratio of the contained Ti to transition metal element or elements belonging to the group IVa, Va and/or VIa of the periodic table including Ti is $\frac{3}{8}$ to 97/100, and further containing 5 to 15 percent by weight of Al, while containing tungsten in the form of at least one of the Ti compound(s), WC and W so that the entire tungsten concentration in the binder is 2 to 20 percent by weight. The CBN powder has an average particle size of not more than 2 μm as mentioned and the powder mixture is sintered under CBN-stable superhigh pressure conditions.

A sintered body according to the present invention is preferably obtained by preparing the aforementioned binder by adding 1 to 10 percent by weight of one or more iron group metals, mixing the same with the CBN powder of not more than 2 μm in average particle size and sintering the mixture under CBN-stable superhigh pressure conditions. The iron group metals include Fe, Co and Ni.

In the structure of the sintered body of the invention, CBN crystals of not more than 2 μm in average particle size are joined to each other by bonding phases.

According to a preferred embodiment of the present invention, the sintered body contains at least one of one or more Ti compounds selected from a group of TiN, Ti(C,N), (Ti,M)(C,N) and (Ti,M)N, titanium boride, aluminum boride, aluminum nitride, a tungsten compound and tungsten in addition to the CBN. The average particle size of CBN is preferably not more than 1 μm. The binder may contain Al in the form of an Al compound. Tungsten is preferably mixed in the form of tungsten boride or tungsten carbide. In the above chemical formulas of the Ti compounds, M preferably represents tungsten.

The sintered body according to the present invention is excellent in strength and wear resistance and CBN particles are prevented from falling out of the sintered body, for the following reasons:

In order to improve the strength of the sintered body, it is necessary to increase the content of CBN. If the CBN content is less than 45 percent by volume of the sintered body, the sintered body has a reduced strength and hardness which is undesirable. If the CBN content exceeds 60 percent by volume of the sintered body, on the other hand, the toughness of the sintered body is reduced to easily cause cutting edge chipping.

In order to prevent CBN particles from falling out of the sintered body and to improve the wear resistance of the sintered body, CBN and the binder or constituents of the binder themselves must be strongly joined to each other. According to the present invention, the Ti compound or compounds and Al contained in the binder react with CBN during sintering under high temperature/high pressure to generate aluminum nitride, aluminum boride and titanium boride thereby to strongly join or bond the CBN and the binder and the constituents of the binder themselves with each other.

It is assumed that, in particular, free Ti contained in the Ti compound or compounds of $TiN_z$, $(Ti(C_{1-x}N_x)_z$, $(Ti,M)(C_{1-x}N_x)_z$ and $(Ti,M)N_z$, where M represents a transition metal element or elements belonging to any one of the groups IVa, Va and/or VIa of the periodic table excluding Ti, easily reacts with the CBN crystals to form a boride such as $TiB_2$ which is strongly bonded to the CBN.

The value of z in the above chemical formulas is preferably within a range of $0.45 \leq z \leq 0.65$. If the value of z is less than 0.45, the binder itself is reduced in strength and hardness in an undesirable way although the content of free Ti is increased to improve the bond strength itself. If the value of z exceeds 0.65, on the other hand, the content of free Ti becomes insufficient whereby the bond strength is reduced, although the binder itself is increased in hardness.

The value of x in the above chemical formulas must be within a range of $0.5 \leq x < 1.0$. TiC is inferior in reactivity with CBN although the same is superior in strength and hardness to TiN. Thus, the bond strength becomes insufficient if the value of x is less than 0.5.

When nitride or nitrides and/or carbo-nitride or carbo-nitrides of the transition metal or metals belonging to any of the groups IVa, Va and/or VIa of the periodic table are solution-treated or mixed with the aforementioned nitride and carbo-nitride of Ti, the binder is increased in strength and the characteristics thereof are further improved as compared to the case of preparing the binder only from a Ti compound or compounds. The atomic ratio of Ti contained in the binder to the metal or metals belonging to any one of the groups IVa, Va and/or VIa of the periodic table including Ti must be 2/3 to 97/100. If the Ti content is less than $\frac{2}{3}$, the bond strength between the binder and the CBN is reduced to an undesirable extent. If the above atomic ratio exceeds 97/100, on the other hand, the binder is reduced in wear resistance and in strength.

The binder preferably contains 5 to 15 percent by weight of Al. If the Al content is less than 5 percent by weight, the reaction between Al and CBN is insufficient to reduce tenacity of the binder for the CBN crystals. If the Al content exceeds 15 percent by weight of the binder, on the other hand, the hardness of the binder itself is reduced to an undesirable extent although the bond strength between the CBN and the binder is increased.

It has been found that the wear resistance can be improved by adding 2 to 20 percent by weight of tungsten to the binder in the form of a nitride or carbo-nitride containing Ti, a tungsten compound and/or a pure tungsten. If the tungsten content is less than 2 percent by weight in the binder, the wear resistance cannot be improved. If the tungsten content exceeds 20 percent by weight, on the other hand, the content of the Ti compound is reduced whereby the junction strength between the CBN and the binder is also undesirably reduced. It has been also found that the binder is improved in wear resistance and strength to exhibit excellent characteristics particularly when M represents tungsten in the aforementioned chemical formulas.

The binder is increased in strength and hardness to further improve the characteristics of the sintered body by the addition of 1 to 10 percent by weight of one or more metals of the iron group to the binder. It is believed that this improvement is due to the fact that the iron group metals have a high reactivity with a boride such as $TiB_2$ or $AlB_2$, whereby a strong bond results with the boride contained in the sintered body. If the content of the iron group metal or metals is less than 1 percent by weight, no improvement of the characteristics is observed. When the content of iron group metal exceeds 10 percent by weight, on the other hand, the binder itself is reduced in strength and hardness.

In the sintered body according to the present invention, CBN crystals are joined with each other through bonding phases formed by the aforementioned binder, to provide a structure which is filled with fine particles of CBN. Thus, it is possible to increase the CBN content, thereby to improve the strength and wear resistance of the sintered body. The CBN must be in the form of fine particles of not more than 2 $\mu$m, preferably not more than 1 $\mu$m in particle size, as mentioned, since the surface quality of the workpiece deteriorates when coarse CBN particles fall out of the sintered body, whereby the work piece surface becomes rough.

According to the present invention, the CBN powder is mixed with the binder containing a Ti compound or compounds, Al and WC, or that further containing one or more metals of the iron group, and sintered under a superhigh pressure, thereby to obtain a sintered body containing 45 to 60 percent by volume of CBN and TiN, Ti(C,N), (Ti,M)(C,N) and/or (Ti,M)N, titanium boride, aluminum boride, aluminum nitride, a tungsten compound and/or tungsten, or the binder further containing one or more iron group metals, as hereinabove described. The binder contains 5 to 15 percent by weight of Al, which forms aluminum boride and aluminum nitride in the sintered body. Further, the binder contains 2 to 20 percent by weight of tungsten, which is in the form of a nitride or carbo-nitride containing Ti, a tungsten compound and/or a pure tungsten. The sintered body according to the present invention is excellent in strength and improved in wear resistance and the surface quality of the machined work piece is improved. Therefore, the sintered body of the invention is suitably applied as a material for making high-accuracy working tools. Further, the present sintered body is also applicable to making tools for intermittent cutting hardened steel, or for cutting of cast iron or heat-resistant alloy.

DESCRIPTION OF THE PREFERRED EMBODIMENTS AND OF THE BEST MODE

Example 1

Powder of a nitride or carbo-nitride containing Ti was mixed with aluminum powder and WC powder, to prepare a binder powder material having an average particle size of not more than 1 $\mu$m.

The materials were mixed in a pot holding a ball of cemented carbide, as shown in Table 1. Referring to Table 1, sample Nos. 1 to 7 were prepared according to the present invention, while sample Nos. 8 to 11 were prepared as reference examples. As to the reference examples, the underlined values are out of the range of composition according to the present invention. The binder powder of each sample was mixed with CBN powder of not more than 1.5 $\mu$m in average particle size in a volume ratio of 50:50, to prepare a mixed powder. A circular plate of cemented carbide composed of WC - 10 wt.% Co was introduced into an Mo vessel, which was then filled with the mixed powder. This vessel was introduced into a superhigh pressure/temperature apparatus, and sintered under a pressure of 51 kb at a temperature of 1320° C. for 30 minutes.

Table 2 shows the results of X-ray diffraction of the sintered bodies thus obtained. Peaks of CBN and those of nitrides and carbo-nitrides containing Ti were observed in all of the sintered bodies. In addition to the above substances, peaks were observed 7 which were regarded as those of $TiB_2$, $AlB_2$, AlN and borides and carbides of W, or W.

These sintered bodies were observed with a scanning type electron microscope, and it was noticed that fine CBN particles were joined with each other through bonding phases. Table 3 shows Vickers hardness values of the sintered bodies.

The aforementioned sintered bodies were worked into inserts for cutting tools, which were applied to cut round bars of 10 mm in diameter made of AISI 52100 ($H_{RC}$: 59 to 61). The cutting conditions were as follows:
Cutting Speed: 100 m/min.
Depth of Cut: 0.1 mm
Feed Rate: 0.05 mm/rev.
Type: Dry Table 3 also shows values of the flank wear width of the cutting edges and values of the maximum height of the surface roughness of the workpieces measured after performing cutting work for one hour. Referring to Table 1, the column of "Atomic Ratio Ti:M" shows the atomic ratios of Ti to transition metals belonging to any of the groups IVa, Va and/or VIa of the periodic table excluding Ti.

TABLE 1

| | Sample No. | Composition of Binder (wt. %) | Atomic Ratio [Ti:M] |
|---|---|---|---|
| Example | 1 | 78$TiN_{0.6}$ 7Al, 15WC | 94.8:5.2 |
| | 2 | 75$Ti(C_{0.3}N_{0.7})_{0.55}$ 15$Al_3Ti$, 10WC | 96.4:3.4 |
| | 3 | 87$(Ti_{0.9}W_{0.1})(C_{0.5}N_{0.5})_{0.48}$ 10Al, 3WC | 89.0:11.0 |
| | 4 | 70$(Ti_{0.8}Ta_{0.2})(C_{0.2}N_{0.8})_{0.65}$ 12Al, 18WC | 72.1:27.9 |
| | 5 | 80$(Ti_{0.8}Zr_{0.1}Mo_{0.1})N_{0.48}$ 5Al, 15WC | 75.4:24.6 |
| | 6 | 78$(Ti_{0.9}V_{0.05}Cr_{0.05})N_{0.63}$ 14Al, 18WC | 84.3:15.7 |
| | 7 | 72$(Ti_{0.8}W_{0.15}Nb_{0.05})(C_{0.1}N_{0.9})_{0.60}$ 18$Al_3Ti$, 10WC | 78.8:21.2 |
| Reference Example | 8 | 70$Ti(C_{0.6}N_{0.4})_{0.50}$ 20Al, 10WC | 96.2:3.8 |
| | 9 | 82$Ti(C_{0.1}N_{0.9})_{0.70}$ 3Al, 15WC | 94.9:5.1 |
| | 10 | 58$TiN_{0.40}$ 7Al, 35WC | 85.8:14.2 |
| | 11 | 83$(Ti_{0.9}Hf_{0.1})(C_{0.2}N_{0.8})_{0.8}$ 16$Al_3Ti$, 1WC | 90.6:9.4 |

TABLE 2

| Sample No. | Result of X-Ray Diffraction |
|---|---|
| Example | |
| 1 | TiN, AlN, $AlB_2$, $TiB_2$, WC |
| 2 | Ti(CN), AlN, $AlB_2$, $TiB_2$, WC |
| 3 | (TiW)(CN), AlN, $AlB_2$, $TiB_2$, WC |
| 4 | (TiTa)(CN), AlN, $AlB_2$, $TiB_2$, WC, W, $WB_2$ |
| 5 | (TiZrMo)(CN), AlN, $AlB_2$, $TiB_2$, WC |
| 6 | (TiVCr)(CN), AlN, $AlB_2$, $TiB_2$, WC, W, $WB_2$ |
| 7 | (TiWNb)(CN), AlN, $AlB_2$, $TiB_2$, WC |
| Reference Example | |
| 8 | Ti(CN), AlN, $AlB_2$, $TiB_2$, WC |
| 9 | Ti(CN), $AlB_2$, $TiB_2$, WC |
| 10 | TiN, AlN, $AlB_2$, $TiB_2$, WC, W, $WB_2$ |

TABLE 2-continued

| Sample No. | Result of X-Ray Diffraction |
|---|---|
| 11 | (TiHf)(CN), AlN, $AlB_2$, $TiB_2$ |

TABLE 3

| Sample No. | Vickers Hardness | Flank Wear Width (mm) | Maximum Height of Surface Roughness of Workpiece (μm) |
|---|---|---|---|
| Example | | | |
| 1 | 3200 | 0.102 | 1.12 |
| 2 | 3200 | 0.110 | 1.22 |
| 3 | 3200 | 0.108 | 1.16 |
| 4 | 3300 | 0.098 | 1.08 |
| 5 | 3250 | 0.105 | 1.32 |
| 6 | 3300 | 0.099 | 1.25 |
| 7 | 3250 | 0.112 | 1.31 |
| Reference Example | | | |
| 8 | 3200 | 0.193 | 2.12 |
| 9 | 3100 | 0.211 | 2.48 |
| 10 | 3000 | 0.175 | 2.05 |
| 11 | 2900 | 0.182 | 2.41 |

EXAMPLE 2

Powder materials of 75 percent by weight of $Ti(C_{0.1}N_{0.9})_{0.60}$, 7 percent by weight of Al and 18 percent by weight of WC were mixed with each other to obtain a binder powder having an average particle size of not more than 1 μm. The binder contains Ti and W in an atomic ratio of 93.6:6.4. The binder powder was mixed with CBN powder to prepare a powder mixture as shown in Table 4. Referring to Table 4, samples Nos. 12 to 15 were prepared according to the present invention, while samples Nos. 16 to 18 were prepared as reference examples. The sample No. 18 was made of CBN powder having particle sizes of 3 to 5 μm. As to the reference examples shown in Table 4, the underlined values are out of the range of CBN particle size and content according to the present invention.

The samples thus obtained were sintered under a superhigh pressure similarly to Example 1, to obtain the sintered bodies. These sintered bodies were worked into inserts for cutting tools.

The inserts thus obtained were applied to cut round bars of 100 mm in diameter and 300 mm in length made of SKD11 ($H_{RC}$: 60 to 62), each having five grooves provided perpendicularly to the axial direction at regular intervals on the outer peripheral surface. The cutting conditions were as follows:
Cutting Speed: 80 m/min.
Depth of Cut: 0.07 mm
Feed Rate: 0.05 mm/rev.
Type: Dry Table 4 shows the number of cutting passages attained before cutting edge chipping with respect to the outer peripheral surfaces interrupted by the grooves, and values of the maximum height of the surface roughness of the workpieces with reference to the passage attained immediately before cutting edge chipping occurred.

TABLE 4

| Sample No. | cBN Particle Size | cBN Content (vol. %) | Number of Cutting Passages attained before Cutting Edge Chipping | Maximum Height of Surface Roughness of Workpiece |
| --- | --- | --- | --- | --- |
| Example 12 | not more than 2 μm | 60 | 25 | 1.51 |
| 13 | 1~2 μm | 55 | 32 | 1.42 |
| 14 | not more than 1 μm | 50 | 30 | 1.21 |
| 15 | not more than 1 μm | 45 | 24 | 1.26 |
| Reference 16 | not more than 2 μm | <u>65</u> | 7 | 1.99 |
| Example 17 | not more than 2 μm | <u>40</u> | 3 | 2.61 |
| 18 | <u>3~5 μm</u> | 55 | 9 | 3.12 |

Example 3

Binder powder materials having particle sizes of not more than 1 μm were prepared as shown in Table 5. Referring to Table 5, the column of "Atomic Ratio Ti:M" shows the atomic ratios of Ti to metals belonging to any of the groups IVa, Va and/or VIa of the periodic table excluding Ti. These binder powder materials were mixed with CBN powder materials of not more than 1 μm in particle size in a volume ratio of 50:50, to obtain a powder mixture.

The powder mixture thus obtained was sintered under a superhigh pressure similarly to Example 1, to obtain sintered bodies. These sintered bodies were worked into inserts for cutting tools.

The inserts thus prepared were applied to cut end surfaces of round bars of 100 mm in diameter made of SNCM411 ($H_{RC}$: 58 to 61). The cutting conditions were as follows:

Cutting Speed: 150 m/min.
Depth of Cut: 0.2 mm
Feed Rate: 0.07 mm/rev.
Type: Dry Table 6 shows the numbers of cutting passages obtained before cutting edge chipping and values of the maximum height of surface roughness of the workpieces observed at the final possible cutting.

Referring to Tables 5 and 6, samples Nos. 19 to 23 were prepared according to the present invention, while samples Nos. 24 and 25 were prepared as reference examples. As to the reference examples shown in Table 5, underlined values are out of the range of the binder composition according to the present invention.

TABLE 5

| | Sample No. | Composition of Binder (wt. %) | Atomic Ratio Ti:M |
| --- | --- | --- | --- |
| Example | 19 | 72(Ti$_{0.9}$W$_{0.1}$)(C$_{0.2}$N$_{0.8}$)$_{0.55}$ 8Al, 15WC, 5Ni | 83.8:16.2 |
| | 20 | 73(Ti$_{0.9}$Hf$_{0.1}$)(C$_{0.1}$N$_{0.9}$)$_{0.60}$ 12Al, 5WC, 10Ni | 87.9:12.1 |
| | 21 | 71(Ti$_{0.9}$Cr$_{0.1}$)(C$_{0.1}$N$_{0.9}$)$_{0.50}$ 14Al, 12WC, 3Co | 85.9:14.1 |
| | 22 | 74(Ti$_{0.9}$W$_{0.1}$)N$_{0.60}$ 10Al, 8WC, 8Co | 86.7:13.3 |
| | 23 | 72Ti(C$_{0.1}$N$_{0.9}$)$_{0.55}$ 8Al, 18WC, 2Fe | 93.4:6.6 |
| Reference Example | 24 | 70(Ti$_{0.9}$W$_{0.1}$)(C$_{0.2}$N$_{0.8}$)$_{0.50}$ 8Al, 7WC, <u>15Ni</u> | 85.5:14.5 |
| | 25 | 79.5(Ti$_{0.8}$W$_{0.1}$Zr$_{0.1}$)(C$_{0.1}$N$_{0.9}$)$_{0.50}$ 12Al, 8WC, <u>0.5Co</u> | 77.1:22.9 |

TABLE 6

| Sample No. | | Maximum Height of Surface Roughness of Workpiece (μm) |
| --- | --- | --- |
| Example | | |
| 19 | 31 | 1.38 |
| 20 | 28 | 1.21 |
| 21 | 35 | 1.30 |
| 22 | 29 | 1.12 |
| 23 | 32 | 1.41 |
| Reference Example | | |
| 24 | 4 | 2.51 |
| 25 | 20 | 1.48 |

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sintered body for high-accuracy working tools obtained by sintering a powder mixture containing at least 45 percent by volume and not more than 60 percent by volume of cubic boron nitride powder having an average particle size of not more than 2 μm and a remainder including a binder powder, said sintered body having been formed under a superhigh pressure, said binder containing at least 5 percent by weight and not more than 15 percent by weight of Al and at least 2 percent by weight and not more than 20 percent by weight of W and including a binder remainder formed of one or more Ti compounds selected from a group consisting of TiN$_z$, Ti(C$_{1-x}$N$_x$)$_z$, (Ti,M)(C$_{1-x}$N$_x$)$_z$ and (Ti, M)N$_z$, where M represents a transition metal element or elements belonging to any one of groups IVa, Va and VIa of the periodic table excluding Ti, wherein z is within the range of 0.45 to 0.65, and wherein x is within the range of 0.50 to 1.0, containing said W in the form of at least one of said Ti compound or compounds, WC and W, the atomic ratio of contained Ti to said transition metal element or elements belonging to any one of groups IVa, Va and VIa of the periodic table including Ti being at least $\frac{2}{3}$ and not more than 97/100, and wherein cubic boron nitride crystals of not more than 2 μm in average particle size are bonded to each other through bonding phases formed by said binder in said sintered body.

2. The sintered body for high-accuracy working tools in accordance with claim 1, containing at least one Ti compound selected from a group consisting of TiN, Ti(C,N), (Ti,M)(C,N) and (Ti,M)N, titanium boride, aluminum boride, and aluminum nitride, a tungsten compound selected from a group consisting of tungsten carbide, tungsten carbide including at least one of titanium and aluminum in solid solution, tungsten nitrides, and tungsten carbo-nitrides, and tungsten in said sintered body in addition to said cubic boron nitride.

3. The sintered body for high-accuracy working tools in accordance with claim 1, wherein said cubic boron nitride is not more than 1 μm in average particle size.

4. The sintered body for high-accuracy working tools in accordance with claim 1, wherein said Al is contained in said binder in the form of an Al compound selected from a group consisting of aluminum nitrides, carbides including at least one of titanium and aluminum in solid solution, carbo-nitrides of aluminum, intermetallic compounds of aluminum and titanium, and aluminum boride.

5. The sintered body for high-accuracy working tools in accordance with claim 1, wherein the tungsten is contained in said powder mixture in the form of one of tungsten boride and tungsten carbide.

6. The sintered body for high-accuracy working tools in accordance with claim 1, wherein said M represents tungsten.

7. A sintered body for high-accuracy working tools obtained by sintering a powder mixture containing at least 45 percent by volume and not more than 60 percent by volume of cubic boron nitride powder having an average particle size of not more than 2 μm and a remainder including a binder powder, said sintered body having been formed under a superhigh pressure, said binder containing at least 5 percent by weight and not more than 15 percent by weight of Al, at least 2 percent by weight and not more than 20 percent by weight of W and at least 1 percent by weight and not more than 10 percent by weight of one or more iron group metals and including a binder remainder formed of one or more Ti compounds selected from a group consisting of $TiN_z$, $Ti(C_{1-x}N_x)_z$, $(Ti,M)(C_{1-x}N_x)_z$ and $(Ti,M)N_z$, where M represents a transition metal element or elements belonging to any one of groups IVa, Va and VIa of the periodic table excluding Ti, wherein z is within the range of 0.45 to 0.65 and x is within the range of 0.50 to 1.0, containing said W in the form of at least one of said Ti compounds, WC and W, the atomic ratio of contained Ti to said transition metal element or elements belonging to any one of group IVa, Va and VIa of the periodic table including T, being at least ⅔ and not more than 97/100, and wherein cubic boron nitride crystals of not more than 2 μm in average particle size are bonded to each other through bonding phases formed by said binder in said sintered body.

8. The sintered body for high-accuracy working tools in accordance with claim 7, containing at least one Ti compound selected from a group consisting of TiN, Ti(C,N), (Ti,M)(C,N) and (Ti,M)N, titanium boride, aluminum boride, aluminum nitride, a tungsten compound selected from a group consisting of tungsten carbide, tungsten carbide including at least one of titanium and aluminum in solid solution, tungsten nitrides, and tungsten carbo-nitrides, and tungsten in said sintered body in addition to said cubic boron nitride.

9. The sintered body for high-accuracy working tools in accordance with claim 7, wherein said cubic boron nitride is not more than 1 μm in average particle size.

10. The sintered body for high-accuracy working tools in accordance with claim 7, wherein said Al is contained in said binder in the form of an Al compound selected from the group consisting of aluminum nitrides, carbides including at least one of titanium and aluminum in solid solution, carbo-nitrides of aluminum and intermetallic compounds of aluminum and titanium.

11. The sintered body for high-accuracy working tools in accordance with claim 7, wherein said tungsten is contained in said powder mixture in the form of one of tungsten boride and tungsten carbide.

12. The sintered body for high-accuracy working tools in accordance with claim 7, wherein said M represents tungsten.

* * * * *

UNITED STATES PATENT AND TRADEMARK OFFICE
CERTIFICATE OF CORRECTION

PATENT NO.   : 5,092,920
DATED        : March 3, 1992
INVENTOR(S)  : Tetsuo Nakai, Mitsuhiro Goto, Tomohiro Fukaya It is certified that error appears in the above-indentified patent and that said Letters Patent is hereby corrected as shown below:

Claim 4, Column 9, line 12, replace "," (second occurrence) by --and--;
        Column 9, line 13, replace "and" (first occurrence) by --,--.
Claim 5, Column 9, line 16, replace "the" by --said--.
Claim 7, Column 10, line 5, replace "group" by --groups--;
        Column 10, line 6, replace "T" by --Ti--.

Signed and Sealed this

First Day of March, 1994

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,092,920
DATED : March 3, 1992
INVENTOR(S) : Tetsuo Nakai, et al

It is certified that error appears in the above-indentified patent and that said Letters Patent is hereby corrected as shown below:

On the title page:
In [57] ABSTRACT, line 23, after "ing" insert --Ti,--.

Signed and Sealed this

Tenth Day of May, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,092,920
DATED : March 3, 1992
INVENTOR(S) : Tetsuo Nakai, et. al.

It is certified that error appears in the above-indentified patent and that said Letters Patent is hereby corrected as shown below:

Title page, item [57], Abstract, line 23, after "ing" insert --Ti,00.

Column 8, Table 6, the second column heading is missing and should read --Number of Cutting Passages attained before Cutting attained before Edge Chipping--.

Signed and Sealed this

Thirtieth Day of August, 1994

Attest:

BRUCE LEHMAN

*Attesting Officer*  *Commissioner of Patents and Trademarks*